(No Model.)
W. E. MAYO.
SUPPLEMENTAL SEAT FOR BICYCLES.
No. 604,699. Patented May 24, 1898.
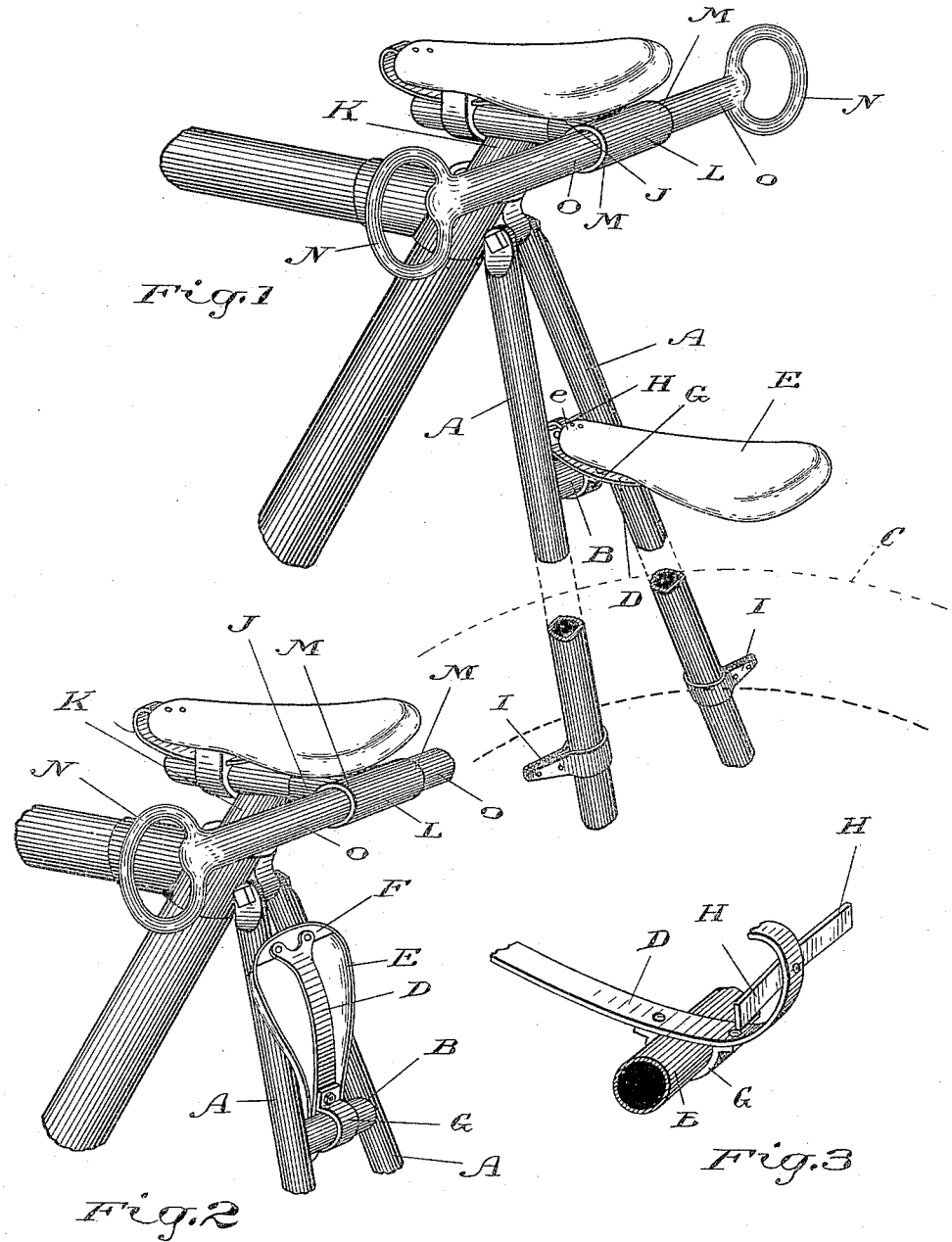

United States Patent Office.

WALTER E. MAYO, OF CHICAGO, ILLINOIS.

SUPPLEMENTAL SEAT FOR BICYCLES.

SPECIFICATION forming part of Letters Patent No. 604,699, dated May 24, 1898.

Application filed September 13, 1897. Serial No. 651,472. (No model.)

*To all whom it may concern:*

Be it known that I, WALTER EUGENE MAYO, of the city of Chicago, in the county of Cook and State of Illinois, have invented a new and useful Supplemental Seat for Bicycles; and I hereby declare that the following is a full, clear, and exact description of the same.

This invention relates to a seat for a bicycle supplemental to the saddle; and the primary object of the invention is to connect the supplemental seat to the rear forks in such a manner that when not in use it can be folded against the frame immediately below the saddle and when in use it can be lowered into a horizontal position over the driving-wheel, while the secondary object of the invention is to provide the rear forks with foot-rests and the saddle-post with hand-grips to be used in conjunction with the supplemental seat, the whole device being hereinafter set forth, and more particularly pointed out in the claims.

In the drawings, Figure 1 represents a perspective view of a bicycle, showing the foot-rests, hand-grips, and supplemental seat in a horizontal position. Fig. 2 is a similar view showing the supplemental seat folded against the frame. Fig. 3 is a view of a portion of the supplemental seat, spring, and tie-plate uniting the rear forks.

Like letters of reference refer to like parts throughout the specification and drawings.

A A represent the upper rear forks.

B represents the tie-plate bracing the rear forks A A above the driving-wheel C.

D represents the spring of the supplemental seat E. The front of the spring D is rigidly united to the horn e of the seat E, while the rear of the spring D is rigidly united to the frame F of the seat E.

G represents a clamp embracing the tie-plate B and rigidly united to the under side of the front of the spring D. The tie-plate B being circular in cross-section and the clamp G being also circular in cross-section and loose on the tie-plate, it follows that the spring D can be tilted into substantially a vertical or a horizontal position. To hold the seat E in a horizontal position there is connected to the spring D on the inner side of the rear forks A A a cross-head H, which bears against the inner side of the rear forks A A when the seat is in its horizontal position and rigidly holds the seat in that position.

I I represent two foot-rests connected to the rear forks A A immediately above the axle of the driving-wheel.

J represents the horizontal head of the saddle-post K.

L represents a T-coupling connected to the rear of the head J. The branches M M of the T-coupling L are each hollow and screw-threaded.

N N represent two hand-grips, the shanks O O of which are screwed into the ends of the branches M M.

I do not confine myself to any particular style of hand-grip nor to any particular style of seat, as I may employ any hand-grip or any seat which can be conveniently used for this purpose; nor do I confine myself to using any particular style of clamp for fastening the supplemental seat to the tie-plate.

In the case of those bicycles where the upper ends of the rear forks are united by a crown and terminate in a single bar I may find it necessary to use a different style of a clamp to attach the supplemental seat.

By placing the seat immediately over the driving-wheels the rider on the supplemental seat is protected from the resistance of the air during the progress of the wheel and is also protected from danger resulting from accident to the wheel.

Having thus fully described my invention, what I claim as new, and desire to secure by Letters Patent, is—

1. In a bicycle, the combination of the rear forks, a tie-plate uniting the rear forks above the driving-wheel, a seat-spring, a clamp united to the seat-spring embracing the tie-plate, a cross-head connected to the seat-spring on the inner side of the rear forks, a seat-frame connected to the rear of the seat-spring, a seat, the rear of the seat being connected to the seat-frame, and the horn of the seat connected to the seat-spring, substantially as specified.

2. In a bicycle, the combination of the rear forks, a tie-plate uniting the rear forks above the driving-wheel, a seat-spring, a clamp united to the seat-spring embracing the tie-plate, a cross-head connected to the seat-spring on the inner side of the rear forks, a seat-frame connected to the rear of the seat-spring, a seat, the rear of the seat being connected to the seat-frame, the horn of the seat connected to the seat-spring, and hand-grips connected to the saddle post, substantially as specified.

3. In a bicycle, the combination of the rear forks, a tie-plate uniting the rear forks above the driving-wheel, a seat-spring, a clamp united to the seat-spring embracing the tie-plate, a cross-head connected to the seat-spring on the inner side of the rear forks, a seat-frame connected to the rear of the seat-spring, a seat, the rear of the seat being connected to the seat-frame, the horn of the seat connected to the seat-spring, hand-grips connected to the saddle-post, and foot-rests connected to the rear forks below the supplemental seat, substantially as specified.

4. In a bicycle, the combination of the rear forks, a tie-plate uniting the rear forks above the driving-wheel, a seat-spring, a clamp united to the seat-spring embracing the tie-plate, a cross-head connected to the seat-spring on the inner side of the rear forks, a seat-frame connected to the rear of the seat-spring, a seat, the rear of the seat being connected to the seat-frame, the horn of the seat connected to the seat-spring, a T-coupling connected to the horizontal part of the seat-post, having hollow screw-threaded branches, and hand-grips having shanks fitted into the hollow screw-threaded branches of the T-coupling, substantially as specified.

5. In a bicycle, the combination of the rear forks, a tie-plate uniting the rear forks above the driving-wheel, a seat-spring, a clamp united to the seat-spring embracing the tieplate, a cross-head connected to the seat-spring on the inner side of the rear forks, a seat-frame connected to the rear of the seat-spring, a seat, the rear of the seat being connected to the seat-frame, the horn of the seat connected to the seat-spring, a T-coupling connected to the horizontal part of the seat-post, having hollow screw-threaded branches, hand-grips having shanks fitted into the hollow screw-threaded branches of the T-coupling, and foot-rests connected to the rear forks below the supplemental seat, substantially as specified.

Toronto, September 8, 1897.

WALTER E. MAYO.

In presence of—
  M. A. WESTWOOD,
  C. H. RICHES.